ns of the United States Patent Office 3,208,366
Patented Sept. 28, 1965

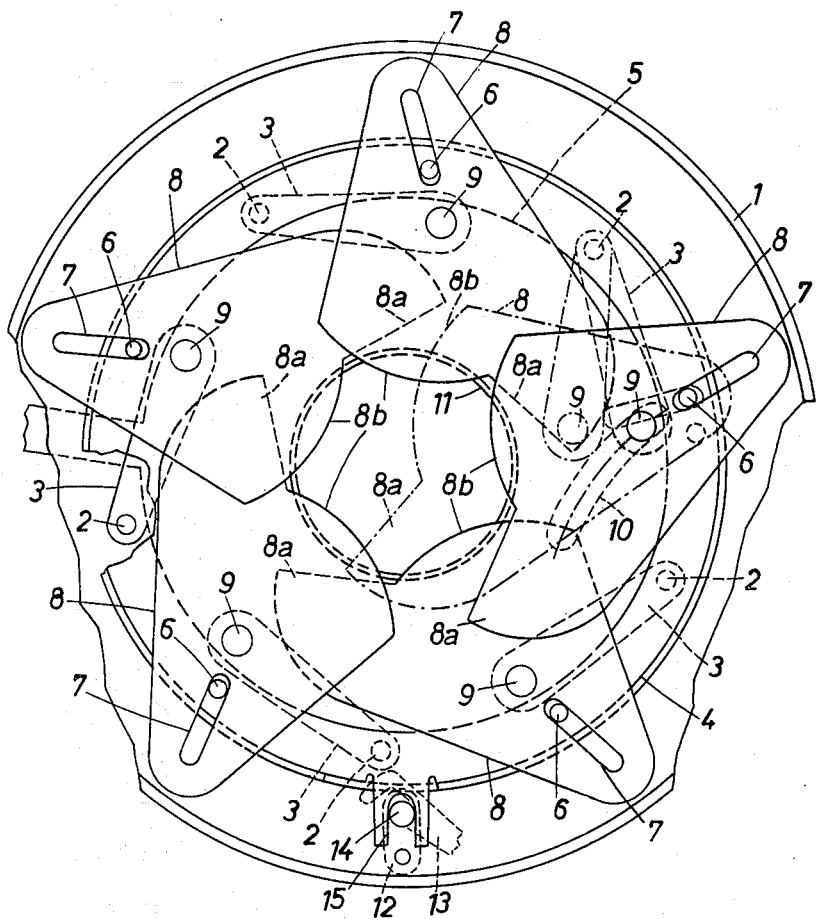

3,208,366
SHUTTER-DIAPHRAGM ASSEMBLIES FOR
PHOTOGRAPHIC DEVICES
Willi Schulz, Schwenningen, and Manfred Müller,
Donaueschingen, Germany, assignors to Agfa Aktiengesellschaft, Leverkusen, Germany
Filed Mar. 11, 1963, Ser. No. 264,239
Claims priority, application Germany, Mar. 10, 1962,
A 39,675
9 Claims. (Cl. 95—63)

The present invention relates to photographic devices and more particularly to shutter-diaphragm assemblies for photographic devices.

The present invention relates in particular to that type of shutter-diaphragm assembly in which a single set of blades perform the functions of both the shutter and a diaphragm.

With conventional between-the-lens shutters where the shutter blades swing back and forth between closed and open positions, it is customary to set the retarding mechanism which determines the exposure time into operation at the instant when the shutter blades are in their fully open position and start to return toward their closed position, and the result of this operation is that the shutter blades vibrate undesirably simultaneously with their change in direction. Because of these vibrations of the shutter blades the operation of the shutter is not as satisfactory as a theoretically ideal operation. Where the photographic device includes a diaphragm made up, for example, of an additional set of blades which operate independently from the shutter blades, then the relationship between the maximum diaphragm opening and the maximum shutter opening is generally so determined that the shutter opening is larger than the largest possible diaphragm opening so that as a result when the shutter is fully open it is completely covered by the diaphragm which determines the size of the opening through which the exposure is made, and as a result the vibrations of the shutter blades which occur simultaneously with their change in direction when they start to return toward their closed position does not have any undesirable influence on the exposure, in the case where the structure is used in a camera. However, with shutter-diaphragm assemblies where a single set of blades are required to perform the functions both of a diaphragm and a shutter, it is not possible to cover the shutter blades in the open position of the shutter so that the undesirable influences resulting from the vibrations of the shutter blades cannot be avoided. Therefore, constructions of this type have as a rule not been used in the objectives of high-quality cameras.

It is accordingly a primary object of the present invention to provide a shutter-diaphragm assembly which includes but a single set of blades for performing the functions of both a diaphragm and a shutter and which at the same time is capable of eliminating any undesirable effects resulting from vibrations of the shutter blades when the shutter is fully open and when the blades start to return toward their closed position.

Another object of the present invention is to provide a shutter-diaphragm assembly in which it is possible to very accurately adjust the size of the aperture through which the exposure is made while maintaining a favorable configuration of this aperture.

It is also an object of the present invention to provide for a construction of the above type blades which are of a relatively small mass so that a large amount of energy is not required to move the blades and so that undesirable inertia effects are avoided.

The objects of the present invention also include the provision of a structure of the above type which the adjustment of the blades to provide a preselected size of exposure aperture also favorably influences the exposure time.

Still another object of the present invention is to provide a shutter-diaphragm assembly which easily lends itself either to manual operation or to automatic operation in response to the action of a suitable light-responsive structure.

The objects of the present invention also include the provision of a structure capable of accomplishing the above objects and at the same time composed of simple rugged elements which provide an extremely compact assembly and which are very reliable in operation.

With the above objects in view, the invention includes, in a shutter-diaphragm assembly for photographic devices, a support means which includes a central plate portion located in a plane which is normal to the optical axis and formed with an aperture whose center is in the optical axis, so that this latter aperture forms the exposure aperture. A plurality of blades are provided with turning axes, respectively, which respectively pass substantially perpendicularly through the blades, which are parallel to the optical axis, and which are uniformly distributed about the optical axis. These blades of the invention respectively have inner tip portions which cooperate to close the exposure aperture when the blades are in a closed position, and these blades are respectively turnable about their turning axes between closed positions where they cover the exposure aperture and open positions where their inner tip portions are displaced from the optical axis to at least partially uncover the exposure aperture. In accordance with the present invention the blades are respectively provided next to their inner tip portions with curved edge portions which respectively form parts of circles whose centers are in the turning axes of the blades, respectively. A shutter drive ring means has its center located in the optical axis and is supported for turning movement by the support means, this shutter drive ring means being operatively connected to the blades to turn the latter about their turning axes between their closed and open positions. A turning means is operatively connected to the shutter drive ring means for turning the latter from a starting position in one direction about the optical axis to a given end position while the drive ring means turns the shutter blades from their closed to their open position, and then the turning means turns the shutter drive ring means from its end position in an opposite direction back to its starting position so as to return the blades from their open back to their closed positions. A plurality of pivot means respectively support the blades for turning movement about their turning axes, and an adjusting means is movably carried by the support means and is operatively connected to the plurality of pivot means for maintaining the plurality of pivot means at all times equidistant from the optical axis and for adjusting the distances of the several pivot means from the optical axis, respectively, so that in this way the extent to which the blades uncover the exposure aperture in the open positions of the blades will be determined by the positions of the plurality of pivot means relative to the optical axis, and thus it is possible for the blades to perform the functions both of a shutter and a diaphragm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which there is shown in a diagrammatic elevation one possible construction of a shutter-diaphragm assembly according to the present invention.

Referring now to the drawing, there is shown therein a shutter-diaphragm assembly which includes a support means 1 in the form of a shutter housing which is provided with a transverse wall located in a plane normal to the optical axis, this transverse wall including a central plate portion which is normal to the optical axis and which is formed with the exposure aperture 11 whose center is in the optical axis.

The assembly includes a plurality of blades 8 which are identical, and these blades 8 are respectively provided with turning axes which extend perpendicularly through the blades 8, and which are parallel to the optical axis, and which are uniformly distributed about the optical axis. The blades 8 are capable of turning about their turning axes, respectively, between closed positions covering the exposure aperture 11 and open positions at least partially uncovering the exposure aperture 11. The structure of the invention includes a plurality of pivot means which serve to pivotally support the several blades 8 for turning movement respectively about their turning axes between their closed and open positions, and this pivot means includes the pivot pins 9 which respectively extend into openings formed in the blades 8, these pivot pins 9 being respectively carried by levers 3 which also form part of the pivot means, and the levers 3 of the pivot means are respectively hingedly carried by the support means 1 through stationary pivots 2. In other words the transverse wall of the shutter housing 1 is formed with bores which respectively receive the pivot pins 2 which are in turn fixed to the levers 3, and these levers 3 fixedly carry the pivot pins 9 which extend into the openings of the several blades 8, so that while the blades 8 are capable of swinging about the turning axes determined by the pivot pins 9, the positions of these pivot pins 9 relative to the optical axis are capable of being adjusted.

A shutter drive ring means 4 has its center located in the optical axis, and this ring means 4 is supported by the support means 1 for turning movement about the optical axis, and the shutter drive ring means 4 is operatively connected to the blades 8 for turning the latter respectively about their turning axes between their closed and open positions. The connection between the drive ring 4 and the several blades take the form of pin-and-slot connections, and for this purpose the ring 4 fixedly carries a plurality of pins 6 which extend parallel to the optical axis and which are respectively received in elongated slots 7 formed in the identical blades 8, respectively, so that, assuming that the pivots 9 are stationary, the turning of the ring 4 from a given starting position in one direction to a given end position and then from the end position back to the starting position will result first in opening and then in closing of the blades.

The support means 1 additionally carries an adjusting means which is operatively connected to the plurality of pivot means 2, 3, 9 for maintaining the plurality of pivot means at all times equidistant from the optical axis while at the same time capable of adjusting the distances of the several pivot means relative to the optical axis, so that in this way it is possible to regulate the size of the aperture which is provided by the blades when they are in their open position. This adjusting means is in the form of a ring 5 which carries an extension accessible to the operator so that the operator may turn the ring 5 to a selected angular position or, if desired, the ring 5 may be operatively connected to a light-responsive structure which will automatically determine the angular position of the ring 5 according to the lighting conditions. The ring 5 is provided with a plurality of camming means which respectively cooperate with the plurality of pivot means for determining the positions of the latter relative to the optical axis, and in the illustrated example the ring 5 is formed with a plurality of slots 10 only one of which is shown for the sake of clarity, and the pins 9 are received in the slots 10 so that according to the curvature of the slots 10 the positions of the pins 9 and thus of the levers 3 relative to the optical axis will be determined by the angular position of the adjusting ring 5.

In accordance with the present invention the several identical blades 8 have a special configuration. Thus, the blades 8 of the invention are respectively provided with inner tip portions 8a which, in the closed position of the blades 8, cooperate with each other to reliably cover the exposure aperture 11 so that no light can pass through the aperture 11 in the closed positions of the blades 8, irrespective of the positions of the plurality of pivot means 2, 3, 9. Also in accordance with the present invention, the several blades 8 include, next to their inner tip portions 8a, curved edge portions 8b which respectively extend along circles whose centers are respectively located in the turning axes of the blades 8. It wil be noted that the curved edge portions 8b have a curvature opposed to the curvature of the edge which defines the circular exposure aperture 11.

When the blades 8 turn from their closed to their open positions, the several inner tip portions 8a thereof become displaced from the optical axis so as to uncover the aperture 11, at least partially, and at this time the size and configuration of the aperture through which an exposure is made, in the case of a camera, are determined by the curved edge portions 8b.

Assuming now that the several blades are in their closed positions, covering the exposure aperture 11, then the turning of the ring 5 will angularly displace the several camming slots 10 so that the edges of these slots will act on the several pins 9 to change the angular positions of the several levers 3, and the result of this adjustment is that the slots 7 of the several blades will ride in one direction or the other along the pins 6, depending upon the direction in which the ring 5 is turned. As a result the extent to which the several blades 8 overlap each other is changed, but throughout the entire range of adjustment which can be provided by the ring 5 the blades 8 will always cover each other to an extent sufficient to prevent any uncovering of the opening 11 while the blades 8 are in their closed positions. As may be seen by reference to the right hand blade 8 of the drawing, if the ring 5 is turned in a counterclockwise direction, as viewed in the drawing, the slot 10 which is shown in the drawing will displace the pin 9 which extends into the slot 10 inwardly toward the optical axis while the lever 3 will turn in a clockwise direction, as viewed in the drawing, to the dot-dash line position shown in the drawing, with the result that the entire blade 8 is shifted inwardly toward the optical axis, and of course the slot 7 thereof will also shift inwardly with respect to the pin 6. Thus, when the ring 5 is turned in a counterclockwise direction, as viewed in the drawing, the extent to which the blades overlap each other in their closed positions is increased with the result thta the size of the aperture through which an exposure is made when the blades are in their open position is reduced. On the other hand, if the ring 5 is turned in a clockwise direction, as viewed in the drawing, the several pins 9 will be displaced outwardly away from the optical axis, with the levers 3 turning correspondingly away from the optical axis and the slots 7 shifting outwardly away from the optical axis, so that the extent to which the blades 8 overlap each other in their closed positions is decreased with the result that the opening provided by the blades 8 when they are in their open positions will be greater, so that in this case the blades 8 when turned to their open positions will uncover the exposure aperture 11 to a greater extent. In this way it is possible for the blades of the invention to perform the functions both of a shutter and of a diaphragm.

A turning means, which may be conventional, is operatively connected to the shutter drive ring means 4 in order to turn the latter first in one direction from its starting to a given end position and then in an opposite direction from the end position back to its starting position, and in the illustrated example this turning means is shown as including a crank 12 which is turnably connected to the support means formed by the housing 1, and a swing member 13 of known construction which cooperates with the crank 12 for turning the latter back and forth. The crank 12 carries a pin 14 which extends into an elongated radial notch 15 formed in a projection of the driving ring 4, so that during the swinging of the crank 12 ring 4 will turn back and forth, and the pins 6 which turn with the ring 4 cooperate through the slot 7 with the blades 8 for swinging the latter from their closed to their open positions and then back to their closed positions. Of course, while the extent of angular movement of the shutter drive ring means 4 remains constant, the extent to which the blades 8 will be turned relative to the opening 11 is determined by the positions of the pivot means 3, 9, as described above, so that in this way the shutter operation in combination with a selected diaphragm aperture will be provided. The largest opening for a given diaphragm setting is attained when the opening through the shutter blades is determined only by the five curved edge portions 8b of the several shutter blades 8.

As was pointed out above, at the maximum opening of the shutter when the shutter blades change their direction and are about to return to their closed positions, the retarding mechanism which provides a selected exposure time is set into operation, with the result that the ring 4, due to its reaction to the setting into operation of the retarded mechanism, starts vibrations of the shutter blades, these vibrations being transmitted to the shutter blades through the ring 4. The retarding structure which provides a selected exposure time is conventional and is not illustrated since it forms no part of the present invention.

With the above-described structure of the shutter blades 8, and as illustrated in the drawings, because the exposure is made through an opening which is defined by the curved edges 8b, the slight oscillatory vibrations of the blades 8 about the pins 9 will have absolutely no effect on the exposure since the curved edges 8b extend along circles whose centers are in the turning axes of the blades 8 and thus the vibratory oscillatory movements of the blades 8 about their turning axes simply move the edges 8b back and forth along the path which they already occupy without any possible movement of the shutter blades toward or away from the optical axis, so that in this way with the structure of the invention any undesirable effects of the unavoidable vibrations of the blades are eliminated. Thus, any turning of the blades 8 about their turning axes in the fully open positions of the blades will have no effect by way of a possible changing of the opening which is provided by the blades 8. The ring 4 turns in a counterclockwise direction to the position illustrated in the drawing in order to displace the blades 8 to their illustrated open positions, and of course the ring 4 turns back in a clockwise direction, as viewed in the drawing, in order to return the blades 8 to their closed positions. The dot-dash line blade 8 illustrated in the drawing shows the smaller aperture provided by the blades when the plurality of pivot means are displaced inwardly toward the optical axis by turning of the adjusting ring 5.

It will be noted that while the ring 4 turns back and forth through the same angle at each operation of the shutter, the angular distances through which the blades 8 will be turned will depend upon the positioning of the several pivot pins 9. Thus, if these pivot pins 9 are relatively close to the pivot pins 6 the blades 8 will be turned through relatively large angles at each operation of the ring 4 while when the pins 9 are relatively distant from the pins 6, closer to the optical axis, the same angular turning of the ring 4 will produce smaller angular turning of the blades 8. As a result, the extent of angular turning of the blades 8 during operation of the assembly diminishes as the size of the aperture diminishes with the result that any tendency of the effective exposure time to become extended is greatly compensated for at relatively small apertures.

Of course, the structure of the invention is not limited to the single example illustrated in the drawing and described above. Any structure which is capable of turning the ring 4 back and forth in order to open and close the shutter blades can be used. Moreover, the pins 9 in addition to extending into openings of the blades 8 as well as into the camming slots 10 of the ring 5 may extend into an additional set of camming slots of an additional adjusting ring similar to the ring 5, and with such a construction the adjustment provided, for example, by manual turning of one of these rings can produce a manual setting of the exposure aperture or diaphragm while the other of the rings can be automatically turned by a suitable light-responsive structure which can turn this other ring to an angular position determined by the lighting conditions, so that in this case it is also possible to position the pins 9 relative to the optical axis automatically according to the lighting conditions, and in such a construction a suitable releasable detent structure would be provided to releasably maintain the manually turnable ring in a predetermined position during operation of the ring which is turned automatically by the light-responsive structure.

It will be understood that each of the elements described above, or two or more together, may also find a useful application in other types of photographic devices differing from the types described above.

While the invention has been illustrated and described as embodied in shutter-diaphragm assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shutter-diaphragm assembly for photographic devices, in combination, support means including a central plate portion located in a plane normal to the optical axis and formed with an exposure aperture whose center is in the optical axis; a plurality of identical blades respectively having turning axes which respectively extend substantially perpendicularly through said blades, which are parallel to the optical axis, and which are uniformly distributed about the optical axis, said blades respectively having inner tip portions which cooperate with each other to close said exposure aperture when said blades are respectively in closed positions relative to their turning axes, respectively, said tip portions of said blades being displaced from the optical axis to open said exposure aperture, at least partially, when said blades are respectively in open positions relative to the turning axes, respectively, and said blades respectively having next to said tip portions thereof curved edge portions which respectively form parts of circles whose centers are respectively located in said turning axes of said blades and which determine the configuration of the exposure aperture when said blades are in said open positions; shutter drive ring means carried by said support means for oscillatory angular movement about the optical axis and being concentric with said optical axis, said shutter drive ring means being operatively connected to said blades for turning the latter about said axes thereof between said closed and open positions; oscillating means operatively connected to said shutter drive ring means for turning the latter from a starting position where said blades are in their closed positions in one direction to an end position where said blades are in their open positions and then in an opposite direction back to said starting position for turning said blades back to their closed positions closing said exposure aperture; a plurality of pivot means respectively connected operatively to said blades for supporting the latter for turning movement about said turning axes thereof; and adjusting means carried by said support means and operatively connected to said plurality of pivot means for maintaining said plurality of pivot means respectively at equal distances from the optical axis and for adjusting the distances of said plurality of pivot means from the optical axis so as to adjust the extent to which said exposure aperture is uncovered by said blades when the latter are turned to their open positions by said shutter drive ring means, whereby said blades perform the functions of a shutter and a diaphragm.

2. In a shutter-diaphragm assembly or photographic devices, in combination, support means including a central plate portion located in a plane normal to the optical axis and formed with an exposure aperture whose center is located in the optical axis; a plurality of identical blades respectively having turning axes which extend substantially perpenduclarly through said blades, which are parallel to the optical axis, and which are uniformly distributed about the optical axis, said blades being turnable relative to said turning axes thereof, respectively, between closed positions closing said exposure aperture and open positions at least partially uncovering said exposure aperture and said blades having inner tip portions which cooperate to close said aperture in the closed positions of said blades and which are displaced from the optical axis in the open position of said blades to at least partially uncover said aperture, said blades respectively having next to said tip portions thereof curved edge portions respectively forming parts of circles whose centers are respectively located in said turning axes of said blades and said curved edge portions of said blades determining the size of an aperture formed by said blades when the latter are in their open positions; shutter drive ring means carried by said support means for turning movement back and forth around the optical axis, said ring means having its center located in the optical axis and said shutter drive ring means being operatively connected to said blades for turning the latter from a starting position, where said blades are in their closed positions, in one direction to an end position, for displacing said blades from their closed to their open positions, respectively, and then back from said end position to said starting position for returning said blades from said open to said closed positions thereof, respectively; a plurality of pivot means respectively supporting said blades for turning movement about said turning axes thereof, respectively, said plurality of pivot means including a plurality of pivot pins respectively connected to said blades, and a plurality of levers respectively carrying said pivot pins and respectively connected distant from said pivot pins to said support means and supported thereby for turning movement respectively about a plurality of axes which also extend parallel to the optical axis and which are uniformly distributed thereabout; and adjusting means carried by said support means and operatively connected to said plurality of pivot means for maintaining the latter at equal distances from the optical axis and for adjusting the distances of said plurality of pivot means from the optical axis so as to adjust the extent to which said blades uncover said aperture when said blades are in their open positions, whereby said blades perform the functions both of a shutter and a diaphragm.

3. In a shutter-diaphragm assembly for photographic devices, in combination, support means including a central plate portion located in a plane normal to the optical axis and formed with a circular exposure aperture whose center is in the optical axis; a plurality of identical blades respectively having turning axes which extend substantially perpendicularly through said blades, which are parallel to the optical axis, and which are uniformly distributed about the optical axis, said blades being turnable about said axes, respectively, between closed positions closing said aperture and open positions at least partly uncovering said aperture, said blades respectively having inner tip portions which cooperate in the closed positions of said blades to close said aperture and which are displaced from the optical axis in the open positions of said blades for at least partially uncovering said exposure aperture, said blades respectively having next to said inner tip portions thereof convexly curved edge portions curved oppositely to the curvature of the edge of said plate portion of said support means which define said exposure aperture and respectively forming parts of circles whose centers are in said turning axes, respectively; shutter drive ring means concentric with the optical axis and supported by said support means for turning movement, said shutter drive ring means being operatively connected to said blades for turning the latter about said turning axes thereof between said closed and open position thereof; turning means operatively connected to said shutter drive ring means for turning the latter from a starting position in one direction to a given end position, for turning said blades from their closed to their open positions, and then in an opposite direction back to said starting position for returning said blades from their open to their closed position; a plurality of pivot means respectively supporting said blades for turning movement about said turning axes thereof; and adjusting means carried by said support means and operatively connected to said plurality of pivot means for maintaining the latter at equal distances from the optical axis, respectively, and for adjusting the distances of said plurality of pivot means from the optical axis so as to adjust the size of the aperture which is formed by said blades when the latter are in their open positions, whereby said blades perform the functions of both a shutter and a diaphragm.

4. In a shutter-diaphragm assembly for photographic devices, in combination, support means including a central plate portion located in a plane normal to the optical axis and formed with an exposure aperture whose center is in the optical axis; a plurality of blades respectively having turning axis which extend substantially perpendicularly through said blades, which are parallel to the optical axis, and which are uniformly distributed about the optical axis, said blades being turnable relative to their turning axis between closed positions closing said aperture and open positions at least partially uncovering said aperture, and said blades respectively having inner tip portions which cooperate to close said aperture in the closed positions of said blades and which are displaced from the optical axis in the open positions of said blades for at least partially uncovering said aperture, said blades respectively having next to said inner tip portions thereof curved edge portions respectively forming parts of circles whose centers are respectively located in said turning axes of said blades, said curved edge portions cooperating to determine the configuration of the exposure aperture when said blades are in said open positions, respectively; shutter drive ring means having a center located in the optical axis and supported by said support means for turning movement back and forth about the optical axis, said shutter drive ring means being operatively connected to said blades for turning the latter between said closed and open positions thereof; turning means operatively connected to said shutter drive ring means for turning the latter between said open and closed positions thereof; turning means operatively connected to said shutter drive ring means for turning the latter from a starting position, where said blades are in their closed positions, in one direction to an end position, for turning said blades from said closed to said open positions thereof, and then in an opposite direction back to said starting position for returning said blades from their open to their closed positions; a plurality of pivot means respectively supporting said blades for turning movement about said turning axes thereof, respectively; and adjusting means carried by said support means and operatively connected to said plurality of pivot means for maintaining said plurality of pivot means at all times at equal distances from the optical axis, respectively, and for adjusting the distances of said plurality of pivot means from the optical axis so as to adjust the size of the aperture formed by said blades when the latter are in their open positions, whereby said blades perform the functions of both a shutter and a diaphragm.

5. In a shutter-diaphragm assembly as recited in claim 4, said blades being respectively formed with openings which respectively receive said pivot pins and said adjusting means being in the form of a ring concentric with the optical axis and supported by said support means for turning movement about the optical axis, said ring carrying a plurality of identical camming portions which respectively engage said plurality of pivot means for adjusting the distances thereof relative to the optical axis.

6. In a shutter diaphragm assembly as recited in claim 5, said camming portions being in the form of slots into which said pivot pins respectively extend.

7. In a shutter-diaphragm assembly for photographic devices, in combination, support means including a central plate portion located in a plane normal to the optical axis and formed with an exposure aperture whose center is in the optical axis; a plurality of blades respectively having turning axes which extend substantially perpendicularly through said blades, which are parallel to the optical axis, and which are uniformly distributed about the optical axis, said blades being respectively turnable about their turning axes between closed positions closing said exposure aperture and open positions at least partially uncovering said exposure aperture, and said blades respectively having inner tip portions which cooperate to close said aperture in the closed positions of said blades and which are displaced from the optical axis to at least partially uncover said exposure aperture in the open position of said blades, and said blades having respectively next to said tip portions thereof curved edge portions which respectively form parts of circles whose centers are in the turning axes of said blades, respectively, said curved edge portions cooperating with each other to determine the configuration of the exposure aperture when said blades are in said open positions, respectively; shutter drive ring means supported for turning movement by said support means and having a center located in the optical axis, said shutter drive ring means respectively having a plurality of pin-and-slot connections with said blades for turning said blades during turning of said shutter drive ring means; turning means operatively connected to said shutter drive ring means for turning the latter from a starting position in one direction to a given end position for displacing said blades from said closed to their opening positions, respectively, and then in an opposite direction from said end position back to said starting position for returning said blades from their open to their closed positions, respectively; a plurality of pivot means respectively supporting said blades for turning movement about said turning axes thereof; and adjusting means carried by said support means and operatively connected to said plurality of pivot means for maintaining said plurality of pivot means at equal distances from the optical axis, respectively, and for adjusting the distances of said plurality of pivot means from the optical axis so as to adjust the extent to which said blades uncover said exposure aperture in the open position of said blades, whereby said blades perform the functions both of a shutter and a diaphragm.

8. In a shutter-diaphragm assembly for photographic devices, in combination, support means including a central plate portion located in a plane normal to the optical axis and formed with an exposure aperture whose center is in the optical axis; a plurality of blades respectively having turning axes which extend substantially perpendicularly through said blades, which are parallel to the optical axis, and which are uniformly distributed about the optical axis, said plurality of blades being turnable about said turning axes thereof, respectively, between closed positions closing said exposure aperture and open positions that at least partially uncover said exposure aperture, and said blades respectively having inner tip portions which cooperate to close said aperture in the closed positions of said blades and which are displaced from the optical axis in the open positions of said blades to at least partially uncover said exposure aperture, said blades having respectively next to said inner tip portions thereof curved edge portions respectively forming parts of circles whose centers in the turning axes of said blades, respectively, said curved edge portions respectively cooperating together to define the configuration of the exposure aperture when said blades are respectively in said open positions; shutter drive ring means having a center located in the optical axis and supported for turning movement by said support means, said shutter drive ring means being operatively connected to said blades for turning the latter about said turning axes thereof, respectively, between said closed and opened positions; turning means operatively connected to said shutter drive ring means for turning the latter from a starting position in one direction to a given end position for turning said blades from said closed to said open positions thereof and then from said end position back to said starting position for returning said blades from said closed to said open positions thereof; a plurality of pivot means supporting said blades for turning movement about said turning axes thereof, respectively, and including a plurality of pivot pins respectively connected operatively to said blades; and adjusting means operatively connected to said plurality of pivot means for maintaining the latter at equal distances from the optical axis and for adjusting the distances of said plurality of pivot means from the optical axis, said adjusting means including a pair of adjusting rings turnably carried by the optical axis and each having a plurality of camming portions respectively engaging said plurality of pivot pins for adjusting the positions thereof relative to the optical axis.

9. In a shutter-diaphragm assembly as recited in claim 8, one of said adjusting rings being manually turnable for manually adjusting the positions of said plurality of pivot pins relative to the optical axis and the other of said adjusting rings being adapted to be operated automatically by a light-responsive structure for automatically determining the positions of said plurality of pivot pins according to the lighting conditions.

References Cited by the Examiner

UNITED STATES PATENTS

| | | | |
|---|---|---|---|
| 885,142 | 4/08 | Brownell | 95—63 |
| 1,883,998 | 10/32 | Lessler | 95—62 |
| 3,099,196 | 7/63 | Neubert | 95—63 |

JOHN M. HORAN, *Primary Examiner.*

NORTON ANSHER, *Examiner.*